May 22, 1962     K. F. FRIEDRICH     3,036,258
ELECTRIC POWER TRANSLATION SYSTEM
Filed Jan. 28, 1959

WITNESSES:
Bernard R. Gieguey
Clement L. McHale

INVENTOR
Kevin F. Friedrich
BY F. E. Browder
ATTORNEY ated May 22, 1962

3,036,258
ELECTRIC POWER TRANSLATION SYSTEM
Kevin F. Friedrich, Sharon, Pa., assignor to Westinghouse Electric Corporation, East Pittsburgh, Pa., a corporation of Pennsylvania
Filed Jan. 28, 1959, Ser. No. 789,702
15 Claims. (Cl. 321—5)

This invention relates to electric power translation systems of the type in which a plurality of asymmetrically-conducting devices are used to interchange power, in one direction or the other, between a first polyphase system and a second system which may be either a direct current system or an alternating current system having a frequency which is different from the first polyphase system.

It has been found that the maximum current rating of certain asymmetrically-conducting devices, such as semiconductor rectifiers and large ignitrons in certain applications, is determined more by the peak current under fault conditions to which such devices are subjected rather than by the average current carried by such devices. In copending application, Serial No. 780,543, filed December 15, 1958, by Donald K. Barnes and assigned to the same assignee as the present application, a new electric power translation system is disclosed in which asymmetrically-conducting devices of the type described are subjected to a lower peak current under fault conditions compared to conventional translation systems. In addition, the translation system, specifically a twelve-phase rectifier circuit, disclosed in said copending application, includes a transformer means which is constructed as a single-rectifier transformer rather than as two individual rectifier transformers having windings disposed on a common magnetic core as is commonly done in a conventional rectifier transformer of the same type. It is, therefore, desirable to provide a translation system having all the advantages of the system disclosed in said copending application and which has several additional advantages, particularly with respect to the transformer means included in the translation system.

It is an object of this invention to provide a new and improved electric power translation system.

Another object of this invention is to provide a new and improved connection arrangement between a transformer means and a plurality of asymmetrically-conducting devices in a translation system for electric power.

Another object of this invention is to provide a new and improved electric power translation system in which a plurality of asymmetrically-conducting devices of a type in which the current rating is determined more by the peak current under fault conditions rather than by the average current carried by each of said devices is subjected to a lower peak current under fault conditions in order to take greater advantage of the current carrying capacity of such devices.

A further object of this invention is to provide a new and improved twelve-phase rectifier circuit including transformer means having a primary winding and two polyphase secondary windings which are all inductively disposed on a common magnetic core and wound as a single transformer rather than as two individual transformers having windings wound on a common magnetic core.

A more specific object of this invention is to provide a twelve-phase, multiple, double interconnected delta, double-way circuit connection between a transformer means and a plurality of asymmetrically-conducting devices of a type in which the current rating of such devices is determined more by the peak current under fault conditions than by the average current carried by said devices in order to take greater advantage of the current carrying capacity of said devices.

Other objects of the invention will, in part, be obvious and will, in part, appear hereinafter.

For a fuller understanding of the nature and objects of the invention, reference should be had to the following detailed description taken in conjunction with the accompanying drawing, in which.

Figure 1:
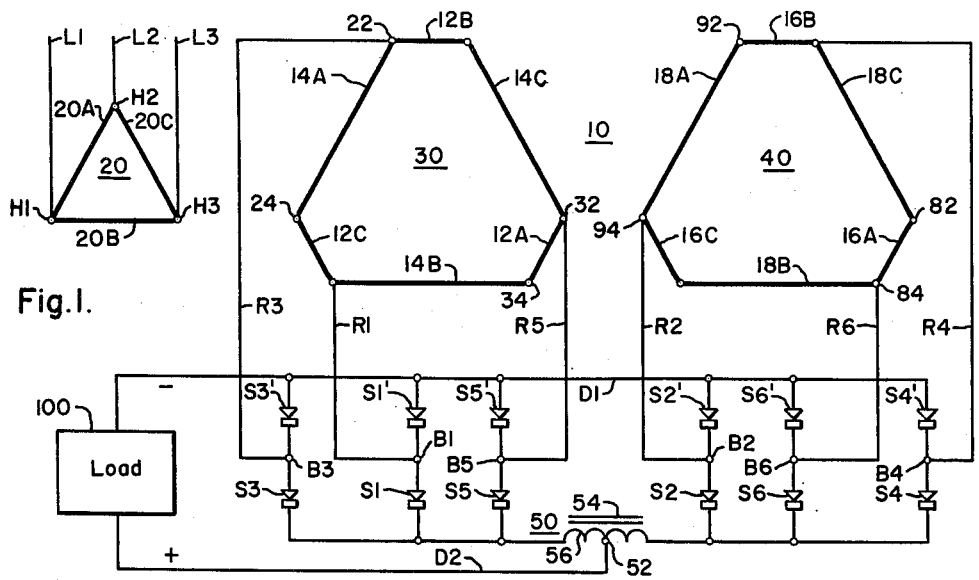
FIGURE 1 is a schematic diagram of an electric power translation system illustrating the teachings of this invention.

Referring to the drawing and FIG. 1 in particular, there is illustrated an electric power translation system of the type in which power is taken from a three-phase power supply system including the power leads L1, L2 and L3 and is transmitted through a plurality of asymmetrically-conducting devices to a unidirectional current circuit having the power leads D1 and D2 to which are connected the load 100. The invention will be described as if the electric power is transferred from the three-phase power leads L1, L2 and L3 to the unidirectional current power leads D1 and D2, but it is to be understood that by the use of well-known inverter connections the direction of power flow could be reversed. The unidirectional current power leads D1 and D2 will be described as if they were a direct current power system which receives power from the three-phase power system at L1, L2 and L3, but it is to be understood that the unidirectional current power leads could be connected to one-phase (or the phase) of a second different frequency alternating current system which receives power from or which transmits power to the three-phase system at L1, L2 and L3 provided that suitable conventional circuit connections are provided.

The plurality of asymmetrically-conducting devices is illustrated as comprising twelve semiconductor rectifying devices S1 through S6 and S1′ through S6′ which may be taken to be broadly representative of twelve single phase asymmetrically-conducting devices of a type in which the current rating of each device is determined more by the peak current under fault conditions than by the average current. The semiconductor rectifying devices S1 through S6 are each connected in series in a bridge-type or double-way connection with the associated semiconductor rectifying devices S1′ through S6′, respectively, the common terminal between each pair of said devices being indicated by the bridge terminals B1 through B6, respectively. The upper end of the semiconductor rectifying devices S1′ through S6′ are illustrated as being all connected to the negative conductor D1 of the direct current bus. The lower end of the semiconductor rectifying devices S1 through S6 are all connected to the positive conductor D2 of the direct current bus through a portion of the interphase reactance means 50, whose purpose will be explained hereinafter.

The transformer means which is provided as part of the translation system comprises a three-phase rectifier transformer 10. The transformer 10 may comprise a three-phase transformer as shown or three individual single-phase transformers. In general, the rectifier transformer 10 is connected between the three-phase power supply system at the power leads L1, L2 and L3 and the rectifier leads R1 through R6 to apply twelve-phase alternating current electric power to the semiconductor rectifying devices S1 through S6 and S1′ through S6′. In particular, the rectifier transformer 10 comprises a polyphase primary winding 20 and two polyphase secondary windings 30 and 40 which are all inductively disposed on a common magnetic core (not shown). The primary winding 20 includes three phase windings 20A, 20B and 20C which are connected in a delta arrangement, the three-phase power supply system at L1, L2 and L3 being connected at the terminals H1, H2 and H3, respectively, of the primary winding 20. The secondary winding 30 comprises three phase windings each including the first and second winding portions 14A and 12C, 14B and 12A and 14C and 12B, respectively. The first winding portions 14A, 14B and 14C are each responsive to the associated primary phase windings 20A, 20B and 20C, respectively. Similarly, the second winding portions 12A, 12B and 12C are responsive to the associated primary phase windings 20A, 20B and 20C, respectively. The secondary winding 40 also comprises three phase windings each including the first and second winding portions 18A and 16B, 18B and 16C and 18C and 16A, respectively. Similar to the secondary winding 30, the winding portions of the secondary winding 40 are responsive to the phase winding of the primary winding 20 including the same letter reference. Each of the first winding portions 14A, 14B and 14C of the secondary winding 30 and each of the first winding portions 18A, 18B and 18C of the secondary winding 40 includes a plurality of turns which is greater than the plurality of turns included in the associated second winding portions 12C, 12A and 12B, respectively and 16B, 16C and 16A, respectively for reasons which will be explained hereafter. The secondary winding 30 is connected to the associated semiconductor rectifiers S3 and S3′, S1 and S1′ and S5 and S5′ at the bridge terminals B3, B1 and B5, respectively by the rectifier leads R3, R1 and R5, respectively. Similarly, the secondary winding 40 is connected to the associated semiconductor rectifying devices S2 and S2′, S6 and S6′ and S4 and S4′ at the bridge terminals B2, B6 and B4, respectively, by the rectifier leads R2, R6 and R4, respectively.

In general, the winding portions of the phase windings of each of the secondary windings 30 and 40 are connected in what is commonly called an interconnected delta connection in order to shift the phase of the output voltages of each of said secondary windings by a predetermined phase angle, preferably a phase angle of substantially 15°, in opposite directions with respect to the voltage at the three-phase power leads L1, L2 and L3. Therefore, the output voltages of the secondary windings 30 and 40 differ by a total phase angle of twice the predetermined phase shift introduced by the interconnected delta connections of each of said secondary windings, preferably by a total phase angle of substantially 30°.

Figure 4:
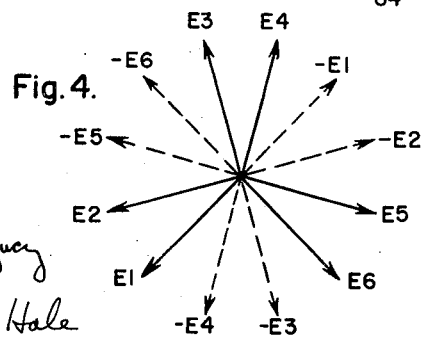
FIG. 4 is a vector representation of the rectifier phase voltages provided in the translation system of FIG. 1.

In particular, the output voltages of the secondary winding 30 are displaced in phase from the voltages at the power leads L1, L2 and L3 by a phase angle of 15° in a counterclockwise direction. For example, the voltage across the phase winding of the secondary winding 30 which includes the first and second winding portions 14A and 12C is displaced in phase from the voltage across the first or main winding portion 14A by a phase angle of substantially 15° in a counterclockwise direction. On the other hand, the output voltages of the secondary winding 40 are displaced in phase from the voltages at the power leads L1, L2 and L3 by a phase angle of substantially 15° in a clockwise direction. For example, the voltage across the phase winding of the secondary winding 40 which includes the first and second winding portions 18A and 16B, respectively, is shifted or displaced in phase from the voltage across the first or main winding portion 18A by a phase angle of substantially 15° in a clockwise direction. Therefore, each of the secondary windings 30 and 40 are connected in an interconnected delta arrangement to produce two sets of three biphase voltages or two sets of six rectifier phase voltages at the rectifier leads R3, R1 and R5 and R2, R6 and R4, respectively, which are each displaced in phase by a phase angle of substantially 15° in opposite directions with respect to the voltage at the power leads L1, L2, and L3. The two sets of six rectifier phase voltages are separated by a total phase angle of substantially 30° to produce twelve substantially symmetrical phase voltages E1 through E6 and —E1 through —E6 which are separated from each other by substantially 60° as shown in FIG. 4. The rectifier phase voltages E1 through E6 are associated with the rectifier leads R1 through R6, respectively, and the corresponding rectifier phase voltages —E1 through —E6 are also associated with the rectifier leads R1 through R6, respectively, the latter rectifier phase voltages being substantially 180° out of phase with the corresponding rectifier phase voltages E1 through E6, respectively.

In common with other polyphase translation systems, the circuit connections described above are such that different rectifier phases which are energized by the instantaneous voltages of different phases of the polyphase circuit are at times operated in parallel with each other so as to simultaneously supply power to or receive power from the same unidirectional current power circuit or bus. As is well known in the art, it is therefore necessary to provide a suitable interphase transformer or reactance means 50 as shown in FIG. 1. The interphase reactance 50 is represented as comprising a winding 56 having a midtap 52 and being inductively disposed on an associated magnetic core 54. The left end of the interphase reactance winding 56 is connected to the lower end of each of the semiconductor rectifiers S3, S1 and S5 and the right end of said winding is connected to the lower end of each of the semiconductor rectifiers S2, S6 and S4. The midtap 52 of the interphase reactance 50 is connected to the positive conductor D2 of the direct current bus. The interphase reactance 50 is provided to develop the instantaneous voltage differences which are necessary to permit the parallel operation of two or more rectifier phases having terminal voltages which do not reach their peaks at the same instance and yet allow independent operation of the parallel rectifier phases. The interphase reactance 50 is capable of absorbing or developing the necessary alternating current voltage difference or ripple voltages to permit the parallel operation of whatever rectifier phases are operating at a particular instant. The interphase reactance 50 would be designed for the sixth harmonic of the fundamental frequency of the voltage at the power leads L1, L2 and L3 and would not be limited to the particular configuration which was chosen for illustration as there are many other kinds and connections of interphase reactance means.

In general, the system connections described above between the rectifier transformer 10, the rectifier leads R1 through R6 and the semiconductor rectifying devices S1 through S6 and S1′ through S6′ may be described as a delta, twelve-phase, multiple, double interconnected delta, double-way connection. As previously described, the interconnected delta connection in each of the secondary windings 30 and 40 of the rectifier transformer 10 produces across said secondary windings two sets of six rectifier phase voltages each separated from the other by substantially 30°. Since six biphase voltages are obtained by the delta, twelve-phase, multiple, double interconnected delta, double-way connection, twelve-phase rectifier operation may be provided by connecting the secondary windings 30 and 40 through the rectifier leads R1 through R6 to the six pairs of semiconductor rectifying devices S1 and S1′ through S6 and S6′, respectively.

The operation of the delta-twelve-phase, multiple, double interconnected delta, double-way connection will now be considered. In general, each of the semiconductor rectifying devices S1 through S6 and S1′ through S6′ conducts for substantially 120° at a time. Any path of current flow will include two of said semiconductor rectifying devices in series with any particular path of current flow continuing for only 60° as each rectifier phase voltage becomes effective to produce output current.

In particular, it is assumed that current flow begins to flow from the secondary winding 30 in the rectifier lead R1 at the beginning of a complete cycle of operation. The path of such current flow can be traced in a series circuit which includes the rectifier lead R1, the bridge terminal B1, the rectifying device S1, the interphase reactance 50, the positive conductor D2, the load 100, the negative conductor D1, the rectifying device S3', the rectifier lead R3 and the first and second winding portions 14A and 12C, respectively. After the first 60° during a complete cycle of operation, current will flow along the path just traced until it reaches the negative conductor D1 but return through the rectifying device S5' to the terminal B5, then through the rectifier lead R5 and the first and second winding portions 12A and 14B. After current flow has continued from the rectifier lead R1 for substantially 120°, current flow will then shift to the rectifier lead R3 and flow for substantially 60° through the bridge terminal B3 and the rectifying device S3, through the interphase reactance 50 to the positive conductor D2, through the load 100 to the negative conductor D1, through the rectifying device S5' to the terminal B5, then through the rectifier lead R5 back to the phase winding which includes the first and second winding portions 12B and 14C, respectively. During the next 60° of operation, current will continue to flow from the rectifier load R3 in the path just traced until it reaches the negative conductor D1 but return back through the rectifying device S1' to the terminal B1, then through the rectifier lead R1 to the other end of the phase winding which includes the first and second winding portions 14A and 12C, respectively. During the final 120° of operation, current will flow from the rectifier lead R5. During the first 60° of current flow from the rectifier lead R5, the current will flow to the terminal B5, through the rectifying device S5, through the interphase reactance 50 to the positive conductor D2, through the load 100 to the negative conductor D1, through the rectifying device S1' to the terminal B1, through the rectifier lead R1 to the other end of the phase winding which includes the first and second winding portions 14B and 12A, respectively. During the final 60° of each cycle of operation, current will flow along the path just traced until the current reaches the negative conductor D1 and then the current will return through the rectifying device S3' to the terminal B3 and through the rectifier lead R3 to the other end of the phase winding which includes the first and second winding portions 14A and 12C, respectively.

The operation of the secondary winding 40 is similar to the operation of the secondary winding 30 just described except that the current flow from the secondary winding 40 through the rectifier leads R2, R6 and R4 is displaced in phase by a phase angle of substantially 30°. For example, current starts to flow from the rectifier lead R2 substantially 30° before current starts to flow from the rectifier lead R3. Current starts to flow from the rectifier lead R4 substantially 30° before current starts to flow from the rectifier lead R5. Finally, current starts to flow from the rectifier lead R6 substantially 30° before current starts to flow from the rectifier lead R1.

It is to be noted, as previously mentioned, that each of the semiconductor rectifying devices S1 through S6 and S1' through S6' conducts for substantially 120° of time but that each current path includes two of said devices in series in a bridge-type or double-way connection and that the path of current flow shifts substantially every 60° during each cycle of operation. It is also to be noted, that one of the rectifier phases associated with each of the secondary windings 30 and 40, respectively, are always operating in parallel at any particular instant. As previously mentioned, any voltage differences, having a frequency which is the sixth harmonic of the fundamental frequency of the three-phase power supply system at L1, L2 and L3, existing between the outputs of the two rectifier phases which are instantaneously operating in parallel will be absorbed by the interphase reactance 50. The conduction of the semiconductor rectifying devices S1 through S6 and S1' through S6' will progress in phase sequence in accordance with the reference numbers of the semiconductor rectifying devices S1 through S6 and S1' through S6', respectively. As one rectifier current path ceases to conduct the next current path in phase sequence will begin to conduct as previously described so that two rectifier phases are always conducting in parallel.

It has been found that a translation system, specifically a rectifier circuit as shown in FIG. 1, results in a lower peak current under fault conditions than a conventional six-phase rectifier circuit of the same general type. In certain sypes of conventional rectifier circuits, particularly those employing semiconductor rectifying devices, a plurality of such devices are often provided in parallel in the different phase connections in order to provide the necessary peak current rating under fault conditions required in a particular rectifier circuit and to prevent the failure of asymmetrically-conducting devices of the type in which the maximum current rating is determined more by the peak current under fault conditions than by the average current carried by said devices. Therefore, in a rectifier circuit or translation system as disclosed, the number of asymmetrically-conducting devices connected in parallel to provide the necessary peak current rating under fault conditions may be reduced compared to the number of devices required in a conventional rectifier circuit.

It is to be noted that the twelve-phase rectifier circuit disclosed has certain inherent advantages over six-phase circuits of the same type. This is because in a rectifier circuit employing semiconductor rectifier devices and including a rectifier transformer, the reactive voltage drop of the rectifier transformer during operation is the main factor affecting regulation. The reactance of a twelve-phase rectifier transformer as disclosed will be approximately twice that of a similar six-phase rectifier transformer for the same value of regulation and reactive voltage drop. Therefore, for the same regulation, a twelve-phase rectifier circuit as disclosed, having approximately twice the reactance of a similar six-phase rectifier circuit, will reduce the peak current under fault conditions to which the asymmetrically-conducting devices included in said circuit are subjected to approximately half the value associated with a similar six-phase rectifier circuit. The latter feature permits a reduction in the number of semiconductor rectifying devices of the type described included in a particular application to prevent failure of such devices.

Figure 2:
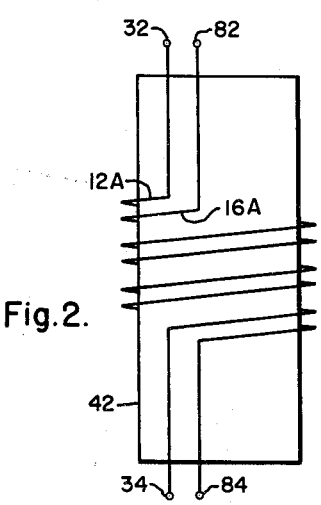
FIGS. 2 and 3 are diagrammatic views illustrating the physical arrangement of some of the windings of the transformer means included in the system of FIG. 1.
Figure 3:
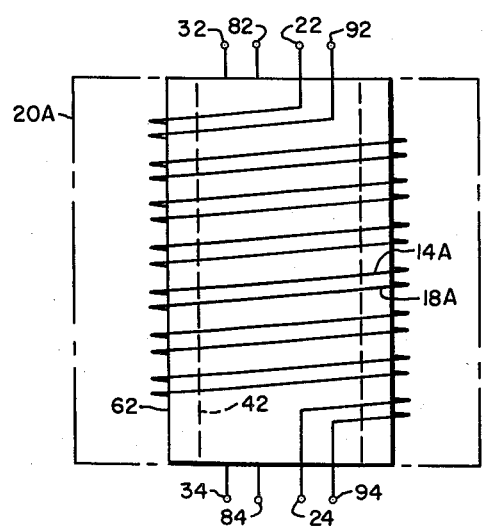

Referring now to FIGS. 2 and 3, there is illustrated the physical arrangement or construction of the first and second winding portions of the secondary windings 30 and 40 which are responsive to the primary phase winding 20A of the primary winding 20. Although not similarly illustrated, the balance of the first and second winding portions of the secondary windings 30 and 40 which are responsive to the phase windings 20B and 20C of the primary winding 20 would be similarly arranged or disposed. In particular, the second winding portions 12A and 16A, as shown in FIG. 2, each includes a plurality of turns which are helically wound about a supporting member 42, preferably an insulating tube, which would be interposed between the turns of said second winding portions and a portion of a magnetic core (not shown) on which said winding portions would be inductively disposed. The turns of the second winding portions 12A and 16A are interwound in order to substantially equalize or balance the magnetic coupling between said second winding portions and the associated primary phase winding 20A, which is preferably concentrically disposed about said second winding portions as indicated in dotted outline in FIG. 3. The upper and lower ends of the second winding portion 12A are brought out to the terminals 32 and 34, as shown in FIG. 2, and also indicated in FIG. 1. Similarly, the upper and lower ends of the second winding portion 16A are brought out to the terminals 82 and 84, respectively, as shown in FIGS. 1 and 2.

Referring now to FIG. 3, the first winding portions 14A and 18A which are also responsive to the primary phase winding 20A each includes a greater number of turns than the second winding portions 12A and 16A in order to obtain the desired phase relation in the output voltages of the secondary windings 30 and 40 as previously discussed. The turns of the first winding portions 14A and 18A are also interwound and helically wound on a separate supporting member 62, preferably an insulating tube, which would be concentrically disposed with respect to the supporting member 42 on which the second winding portions 12A and 16A are wound. The latter windings are also responsive to the primary phase winding 20A. The upper and lower ends of the first winding portions 14A and 18A are brought out to the terminals 22 and 24 and 92 and 94, respectively. The primary phase winding 20A is preferably concentrically disposed with respect to the first winding portions 14A and 18A, similarly to the second winding portions 12A and 16A, to substantially equalize or balance the magnetic coupling between each of the first winding portions and the primary phase winding 20A. Because of the interwound construction of the different winding portions of the secondary windings 30 and 40 and the substantially symmetrical or concentric disposition or arrangement of said winding portions with respect to the associated phase windings of the primary winding 20, the reactance and turns of each of said secondary windings are inherently substantially equal. The latter construction substantially eliminates the problems of equalizing the magnitudes of the voltages of the different secondary windings and of balancing the reactances between the different secondary windings and the associated primary winding as required in a conventional twelve-phase rectifier transformer and substantially eliminates the necessity for special insulation between groups of secondary phase windings as required in a conventional rectifier transformer of the same general type.

It is to be understood that a rectifier transformer may be provided in a system of the type disclosed in which the primary winding is Y connected rather than delta connected as shown for the rectifier transformer 10. Since the polyphase secondary windings of a rectifier transformer as disclosed are connected in an interconnected delta arrangement, a separate tertiary winding would never be required for neutral stabilization or harmonic suppression even when the associated primary winding is Y connected. The interconnected delta secondary windings of a rectifier transformer as disclosed have another advantage in that the current rating of the phase windings of the secondary phase windings does not have to be as great as the line current rating of the rectifier transformer as would be the case if the secondary windings were Y connected. The latter arrangement of the rectifier transformer as disclosed also reduces the current rating required for certain of the interconnections between the first and second winding portions of the two secondary windings included in the rectifier transformer. The latter features provide advantages which are in addition to those provided by the electric power translation system disclosed in copending application, Serial No. 780,543 previously mentioned.

In summary, the circuits and apparatus embodying the teachings of this invention have several advantages. For example, in a translation system, such as a rectifier circuit, including a plurality of asymmetrically-conducting devices of a type in which the current rating is determined more by the peak current under fault conditions than by the average current carried by said devices, the peak current under fault conditions to which such devices are subjected would be lower in a rectifier system as disclosed compared to conventional rectifier circuits of the same type. In addition, a twelve-phase translation system, specifically a rectifier circuit as disclosed, provides a rectifier transformer construction including a plurality of secondary windings which are wound as if for a single transformer rather than as for two individual transformers having windings disposed on a common magnetic core. Compared to a conventional rectifier transformer having a Y connected secondary winding and a delta connected secondary winding, the rectifier construction disclosed permits a magnetic core construction having a lower height with a corresponding improvement in the space factor of the assembled core and windings and substantially eliminates the necessity for special insulation between groups of secondary phase windings. Finally, since each of the secondary phase windings included in the secondary windings of a rectifier transformer as disclosed, conducts for substantially two-thirds of each cycle of operation, greater utilization is made of the windings of such a transformer compared to a conventional translation system or rectifier circuit based on single-way operation.

Since numerous changes may be made in the above-described apparatus and circuits and different embodiments of the invention may be made without departing from the spirit and scope thereof, it is intended that all the matter contained in the foregoing description or shown in the accompanying drawing shall be interpreted as illustrative and not in a limiting sense.

I claim as my invention:

1. An electric power translation system, comprising unidirectional current power leads, three-phase power leads, transformer means including a three-phase primary winding connected to said three-phase power leads and two three-phase secondary windings, said secondary windings each being delta interconnected to shift the output voltages of said secondary windings by a predetermined phase angle in opposite directions with respect to said three-phase power leads, a pluraltiy of separate, single-phase asymmetrically-conducting devices of a type in which the rating is determined more by the peak current under fault conditions than by the average current carried by each of said devices, a twelve-phase, multiple, double interconnected delta, double-way circuit connection for connecting said devices between said unidirectional leads and said transformer means, and interphase reactance means connected in circuit relation with said devices and said transformer means for absorbing the instantaneous voltage differences necessary to permit a portion of said devices to operate in parallel at all times.

2. An electric power translation system, comprising unidirectional current power leads, three-phase power leads, transformer means including a three-phase primary winding delta connected to said three-phase power leads and two three-phase secondary windings, said secondary windings each being delta interconnected to shift the output voltages of said secondary windings by a predetermined phase angle of substantially 15° in opposite directions with respect to said three-phase power leads, a plurality of separate, single-phase asymmetrically-conducting devices of a type in which the rating is determined more by the peak current under fault conditions than by the average current carried by each of said devices, a delta twelve-phase, multiple, double interconnected delta, double-way circuit connection for connecting said devices between said unidirectional leads and said transformer means, and interphase reactance means connected in circuit relation with said devices and said transformer means for absorbing the instantaneous voltage differences necessary to permit a portion of said devices to operate in parallel at all times.

3. An electric power translation system, comprising unidirectional current power leads, three-phase power leads, transformer means including a three-phase primary winding connected to said three-phase power leads and two three-phase secondary windings, said secondary windings each being delta interconnected to shift the output voltages of said secondary windings by a predetermined phase angle in opposite directions with respect to said three-phase power leads, a plurality of separate, single-phase semiconductor rectifying devices, a twelve-phase, multiple, double interconnected delta, double-way circuit connection for connecting said devices between said unidirectional leads and said transformer means, and interphase reactance means connected in circuit relation with said devices and said transformer means for absorbing the instantaneous voltage differences necessary to permit a portion of said devices to operate in parallel at all times.

4. An electric power translation system, comprising unidirectional current power leads, three-phase power leads, transformer means including a three-phase primary winding delta connected to said three-phase power leads and two three-phase secondary windings, said secondary windings each being delta interconnected to shift the output voltages of said secondary windings by a phase angle of substantially 15° in opposite directions with respect to said three-phase power leads, a plurality of separate, single-phase semiconductor rectifying devices, a delta twelve-phase, multiple, double interconnected delta, double-way circuit connection for connecting said devices between said unidirectional leads and said transformer means, and interphase reactance means connected in circuit relation with said devices and said transformer means for absorbing the instantaneous voltage differences necessary to permit a portion of said devices to operate in parallel at all times.

5. An electric power translation system, comprising unidirectional current power leads, three-phase power leads, transformer means including a three-phase primary winding connected to said three-phase power leads and two delta interconnected secondary windings each inductively disposed on a common magnetic core with said primary winding and each including three phase windings, each of said secondary phase windings comprising first and second winding portions each having a plurality of turns and being interconnected to shift the output voltages of each of said secondary windings by a predetermined phase angle of substantially 15° in opposite directions with respect to said three-phase power leads, the turns of the respective winding portions being interwound in pairs about a portion of said core, a plurality of asymmetrically-conducting devices of a type in which the maximum rating is determined more by the peak current under fault conditions than by the average current carried by each of said devices, a twelve-phase, multiple, double interconnected delta, double-way circuit connection for connecting said devices between said unidirectional current leads and said transformer means, and interphase reactance means connected in circuit relation with said devices and said transformer means for absorbing the instantaneous voltage differences necessary to permit a portion of said devices to operate in parallel at all times.

6. An electric power translation system, comprising unidirectional current power leads, three-phase power leads, transformer means including a three-phase primary winding delta connected to said three-phase power leads and two delta interconnected secondary windings each inductively disposed on a common magnetic core with said primary winding and each including three phase windings, each of said secondary phase windings comprising first and second winding portions each having a plurality of turns and being interconnected to shift the output voltages of each of said secondary windings by a predetermined phase angle in opposite directions with respect to said three-phase power leads, the turns of the respective winding portions being interwound in pairs about a portion of said core, a plurality of asymmetrically-conducting devices of a type in which the maximum rating is determined more by the peak current under fault conditions than by the average current carried by each of said devices, a delta twelve-phase, multiple, double interconnected delta, double-way circuit connection for connecting said devices between said unidirectional current leads and said transformer means, and interphase reactance means connected in circuit relation with said devices and said transformer means for absorbing the instantaneous voltage differences necessary to permit a portion of said devices to operate in parallel at all times.

7. An electric power translation system, comprising unidirectional current power leads, three-phase power leads, transformer means including a three-phase primary winding connected to said three-phase power leads and two delta interconnected secondary windings each inductively disposed on a common magnetic core with said primary windings and each including three phase windings, each of said secondary phase windings comprising first and second winding portions each having a plurality of turns and being interconnected to shift the output voltages of each of said secondary windings by a predetermined phase angle of substantially 15° in opposite directions with respect to said three-pase power leads, the turns of the respective winding portions being interwound in pairs about a portion of said core, a plurality of semiconductor rectifying devices, a twelve-phase, multiple, double interconnected delta, double-way circuit connection for connecting said devices between said unidirectional current leads and said transformer means, and interphase reactance means connected in circuit relation with said devices and said transformer means for absorbing the instantaneous voltage differences necessary to permit a portion of said devices to operate in parallel at all times.

8. An electric power translation system, comprising unidirectional current power leads, three-phase power leads, transformer means including a three-phase primary winding delta connected to said three-phase power leads and two delta interconnected secondary windings each inductively disposed on a common magnetic core with said primary winding and each including three-phase windings, each of said secondary phase windings comprising first and second winding portions each having a plurality of turns and being interconnected to shift the output voltages of each of said secondary windings by a predetermined phase angle of substantially 15° in opposite directions with respect to said three-phase power leads, the turns of the respective winding portions being interwound in pairs about a portion of said core, a plurality of semiconductor rectifying devices, a delta, twelve-phase, multiple, double interconnected delta, double-way circuit connection for connecting said devices between said unidirectional current leads and said transformer means, and interphase reactance means connected in circuit relation with said devices and said transformer means for absorbing the instantaneous voltage differences necessary to permit a portion of said devices to operate in parallel at all times.

9. An electric power translation system, comprising direct-current power leads, three-phase power leads, a plurality of asymmetrically-conducting devices of a type in which the rating is determined more by the peak current under fault conditions than by the average current carried by each of said devices, transformer means including a three-phase primary winding connected to said three-phase power leads and two delta interconnected secondary windings, each of said secondary windings being disposed on a common magnetic core with said primary winding and each including three phase windings, each secondary phase winding comprising first and second winding portions, each of said first and second portions of each secondary phase winding including a plurality of turns and being interconnected to shift the output voltages of each of said secondary windings by a predetermined phase angle in opposite directions with respect to said three-phase power leads, the turns of the respective winding portions being interwound in pairs about a portion of said core, each pair of secondary phase winding portions being disposed substantially concentrically with respect to said primary winding, a twelve-phase, multiple, double interconnected delta, double-way circuit connection for connecting said devices between said direct-current leads and said transformer means, and interphase reactance means connected in circuit relation with said devices and said transformer means for absorbing the instantaneous voltage differences necessary to permit a portion of said devices to operate in parallel at all times.

10. An electric power translation system, comprising direct-current power leads, three-phase power leads, a plurality of asymmetrically-conducting devices of a type in which the rating is determined more by the peak current under fault conditions than by the average current carried by each of said devices, transformer means including a three-phase primary winding delta connected to said three-phase power leads and two delta interconnected secondary windings each being disposed on a common magnetic core with said primary winding and each including three phase windings, each secondary phase winding comprising first and second winding portions each including a plurality of turns and being interconnected to shift the output voltages of each of said secondary windings by a predetermined phase angle of substantially 15° in opposite directions with respect to said three-phase power leads, the turns of the respective winding portions being interwound in pairs about a portion of said core, each pair of secondary winding portions being disposed substantially concentrically with respect to said primary winding, a delta, twelve-phase, multiple double interconnected delta, double-way circuit connection for connecting said devices between said direct-current leads and said transformer means, and interphase reactance means connected in circuit relation with said devices and said transformer means for absorbing the instantaneous voltage differences necessary to permit a portion of said devices to operate in parallel at all times.

11. An electric power translation system, comprising direct-current power leads, three-phase power leads, a plurality of semiconductor rectifying devices, transformer means including a three-phase primary winding connected to said three-phase power leads and two delta interconnected secondary windings each being disposed on a common magnetic core with said primary winding and each including three phase windings, each secondary phase winding comprising first and second winding portions each including a plurality of turns and being interconnected to shift the output voltages of each of said secondary windings by a predetermined phase angle in opposite directions with respect to said three-phase power leads, the turns of the respective winding portions being interwound in pairs about a portion of said core, each pair of secondary winding portions being disposed substantially concentrically with respect to said primary winding, a twelve-phase, multiple, double interconnected delta, double-way circuit connection for connecting said devices between said direct-current leads and said transformer means, and interphase reactance means connected in circuit relation with said devices and said transformer means for absorbing the instantaneous voltage differences necessary to permit a portion of said devices to operate in parallel at all times.

12. An electric power translation system, comprising direct-current power leads, three-phase power leads, a plurality of semiconductor rectifying devices, transformer means including a three-phase primary winding delta connected to said three-phase power leads and two delta interconnected secondary windings each being disposed on a common magnetic core with said primary winding and each including three phase windings, each secondary phase winding comprising first and second winding portions each including a plurality of turns and being interconnected to shift the output voltages of each of said secondary windings by a predetermined phase angle of substantially 15° in opposite directions with respect to said three-phase power leads, the turns of the respective winding portions being interwound in pairs about a portion of said core, each pair of secondary winding portions being disposed substantially concentrically with respect to said primary winding, a delta, twelve-phase, multiple, double interconnected delta, double-way circuit connection for connecting said devices between said direct-current leads and said transformer means, and interphase reactance means connected in circuit relation with said devices and said transformer means for absorbing the instantaneous voltage differences necessary to permit a portion of said devices to operate in parallel at all times.

13. An electric power translation system, comprising unidirectional current power leads, three-phase power leads, transformer means including a single three-phase primary winding connected to said three-phase power leads and two three-phase secondary windings, said secondary windings each being delta interconnected to shift the output voltages of said secondary windings by a phase angle of substantially 15° in opposite directions with respect to said three-phase power leads, a plurality of separate, single-phase asymmetrically-conducting devices of a type in which the rating is determined more by the peak current under fault conditions than by the average current carried by each of said devices, a twelve-phase, multiple, double interconnected delta, double-way circuit connection for connecting said devices between said unidirectional leads and said transformer means, and interphase reactance means connected in circuit relation with said devices and said transformer means for absorbing the instantaneous voltage differences necessary to permit a portion of said devices to operate in parallel at all times.

14. An electric power translation system, comprising direct-current power leads, three-phase power leads, a plurality of asymmetrically-conducting devices of a type in which the rating is determined more by the peak current under fault conditions than by the average current carried by each of said devices, transformer means including a single three-phase primary winding connected to said three-phase power leads and two delta interconnected secondary windings, each of said secondary windings being disposed on a common magnetic core with said primary winding and each including three phase windings, each secondary phase winding comprising first and second winding portions, each of said first and second portions of each secondary phase winding including a plurality of turns and being interconnected to shift the output voltages of each of said secondary windings by a phase angle of substantially 15° in opposite directions with respect to said three-phase power leads, the turns of the respective secondary winding portions being interwound in pairs about a portion of said core, each pair of secondary winding portions being disposed substantially concentrically with respect to said primary winding, a twelve-phase, multiple, double interconnected delta, double-way circuit connection for connecting said devices between said direct-current leads and said transformer means, and interphase reactance means connected in circuit relation with said devices and said transformer means for absorbing the instantaneous voltage differences necessary to permit a portion of said devices to operate in parallel at all times.

15. An electric power translation system, comprising direct-current power leads, three-phase power leads, a plurality of asymmetrically-conducting devices of a type in which the rating is determined more by the peak current under fault conditions than by the average current carried by each of said devices, transformer means including a primary winding having three primary phase windings connected to said three-phase power leads and two delta interconnected secondary windings, each of said secondary windings being disposed on a common magnetic core with said primary winding and each including three phase windings, each secondary phase winding comprising first and second winding portions responsive to different phase windings of said primary winding, each of said first and second portions of each secondary phase winding including a plurality of turns and being interconnected to shift the output voltages of each of said secondary windings by a predetermined phase angle of substantially 15° in opposite directions with respect to said three-phase power leads, the turns of the respective secondary winding portions which are responsive to the same primary phase winding being interwound in pairs about a portion of said core to substantially equalize the magnetic coupling between the different winding portions of each secondary winding and said primary winding, each pair of secondary winding portions being disposed substantially concentrically with respect to one of the phase windings of said primary winding, a twelve-phase, multiple, double inter- connected delta, double-way circuit connection for connecting said devices between said direct-current leads and said transformer means, and interphase reactance means connected in circuit relation with said devices and said transformer means for absorbing the instantaneous voltage differences necessary to permit a portion of said devices to operate in parallel at all times.

References Cited in the file of this patent

UNITED STATES PATENTS

| | | |
|---|---|---|
| 1,932,272 | Kaar | Oct. 24, 1933 |
| 2,374,029 | Maslin | Apr. 17, 1945 |
| 2,428,014 | Curry et al. | Sept. 30, 1947 |
| 2,825,022 | Boyer et al. | Feb. 25, 1958 |